United States Patent [19]

Ono et al.

[11] Patent Number: 4,548,855
[45] Date of Patent: Oct. 22, 1985

[54] POLYESTER FILM FOR MAGNETIC RECORDING MEDIUM

[75] Inventors: Masaaki Ono, Omihachiman; Masahiko Motegi, Hikone; Kazuo Okabe, Shiga, all of Japan

[73] Assignee: Toray Industries, Inc., Tokyo, Japan

[21] Appl. No.: 546,649

[22] Filed: Oct. 28, 1983

[30] Foreign Application Priority Data

Nov. 2, 1982 [JP] Japan ............... 57-193159
Nov. 2, 1982 [JP] Japan ............... 57-193160
Dec. 28, 1982 [JP] Japan ............... 57-231209

[51] Int. Cl.$^4$ .............................................. G11B 5/70
[52] U.S. Cl. ......................... 428/147; 360/134;
428/141; 428/145; 428/149; 428/152; 428/201;
428/216; 428/336; 428/447; 428/480; 428/694;
428/900; 428/323; 428/329; 428/330; 428/331
[58] Field of Search ............... 428/447, 481, 483, 480,
428/694, 900, 141, 145, 147, 149, 152, 695, 201,
450, 457, 215, 216, 336, 323, 329, 330, 331;
528/275, 286; 427/128, 132; 360/134

[56] References Cited

U.S. PATENT DOCUMENTS

| | | | |
|---|---|---|---|
| 4,106,948 | 8/1978 | Cooper | 428/447 |
| 4,198,458 | 4/1980 | Mitsuishi | 428/409 |
| 4,233,352 | 11/1980 | Ono | 428/447 |
| 4,348,446 | 9/1982 | Mitsuishi | 428/409 |
| 4,367,262 | 1/1983 | Vaughn | 428/447 |
| 4,489,117 | 12/1984 | Ono | 428/147 |

Primary Examiner—Ellis P. Robinson
Attorney, Agent, or Firm—Austin R. Miller

[57] ABSTRACT

Disclosed is a polyester film for a magnetic recording medium, which is comprised of a polyester film, a discontinuous film layer or layers adhering closely to one surface or both the surfaces of the polyester film, and fine particles present in the discontinuous film layer or layers and on the or each surface of the discontinuous film layer or layers, or on the exposed surface or surfaces of the polyester film in the portions where the discontinuous film layer or layers are not present. The discontinuous film layer or layers have a thickness of not larger than 500 angstroms and are composed mainly of a water-soluble polymer.

33 Claims, 7 Drawing Figures

POLYESTER FILM FOR MAGNETIC RECORDING MEDIUM

BACKGROUND OF THE INVENTION (1) Field of the Invention

This invention relates to a base film for a magnetic recording medium. More particularly, it relates to a base film suitable for a super high density magnetic recording medium.

(2) Description of the Prior Art

With an increase of the recording density in the magnetic recording medium, the surface smoothness required for a polyester film used for the recording medium is increased. On the other hand, in order to improve the operation adaptability at the film-forming step or the magnetic tape-preparing step, slip characteristics are required for the surface of the film. Moreover, the slip of the magnetic tape is crucial. Namely, it is required for a polyester base film suitable for a magnetic recording medium to have excellent smoothness and good slip characteristics.

As means for satisfying these requirements, there has been adopted a method in which fine particles are incorporated in the starting polymeric material for formation of a smooth film. However, according to this conventional technique, if either one of the smoothness or the slip characteristics is improved, the other property is degraded, and it has heretofore been impossible to improve both the properties simultaneously.

A conventional magnetic recording tape is of the so-called coating type, which is prepared by coating a base film with a magnetic paint comprising a magnetic powder and an organic polymer binder, and the coating layer has a relatively large thickness, i.e., ordinarily 3 to 6 $\mu$m. Accordingly, it seldom happens that the irregularities on the surface of the base film are reproduced in the magnetic layer to cause drastic reduction of the electromagnetic performances. Therefore, in the conventional base film for the magnetic recording medium, a method has been employed wherein finely divided particles are incorporated in the starting polymeric material or generated particles are formed in the starting polymeric material from the polymerization catalyst residue, whereby slip characteristics are imparted to the film.

However, this magnetic recording medium of the coating type does not satisfy the recent requirement of realizing a super high magnetic recording density. Accordingly, a so-called metallized film tape having a highly magnetic, thin metal surface layer formed by vacuum evaporation or sputtering without the use of a binder has become popular as a super high recording density video tape instead of the magnetic recording medium of the coating type.

The thickness of the magnetic metal layer of the above-mentioned metallized film tape is usually 0.05 to 0.2 $\mu$m, namely, much thinner than that in the magnetic tape of the coating type. Therefore, the surface configuration of the base film used is completely reproduced on the surface of the metallized film tape. Accordingly, if the surface roughness of the base film is large, the electromagnetic performances of the metal thin-film video tape is extremely reduced. In fact, even if a metal thin-film video tape formed from a finely divided particle-incorporated base film is used in a VTR (video tape recorder), no image is reproduced, namely, this tape cannot be used as a video tape at all.

In view of the electromagnetic performances, a base film having quite a smooth surface is preferred, but practically, the following problem arises such a smooth surface film. More specifically, a vacuum-deposited metal film formed on a base film having quite a smooth surface is inferior in slip characteristics of the surface, and therefore, unless, for example, a protecting film layer is formed thereon, many scratches are inevitably produced on the surface of the vacuum-deposited metal film by contact with various guide pins, heads and the like in the tape-forming process after the vacuum evaporation step or during the use thereof in a video tape recorder.

As a base film for the high density magnetic recording medium in which the foregoing defect is eliminated, reduction of the electromagnetic performances is minimized and the slip characteristics are improved, we previously proposed in U.S. Pat. No. 4,233,352 a polyester film having on at least one surface thereof a discontinous film formed of worm-like nodules composed of a mixture of a water-soluble polymer and a polysiloxane or styrene-butadiene rubber. The above-mentioned problem has been substantially solved by this proposal and a good image can be reproduced even when a metallized film is used as a video tape.

Although a video tape can be prepared by vacuum deposition on the above polyester film proposed previously by us, from the results of research, it has been found that the running property and durability of the vacuum-deposited surface are poor under high temperature and high humidity conditions though these properties are satisfactory under normal temperature and normal humidity conditions.

SUMMARY OF THE INVENTION

It is a primary object of the present invention to provide a base film capable of forming thereon vacuum-deposited film which is excellent in the smoothness and scratch resistance and exhibits a good running property not only in a normal environment but also under high temperature and high humidity conditions.

Another object of the present invention is to provide a polyester film valuable as a base film of a video tape or magnetic recording tape.

More specifically, in accordance with the present invention, there is provided a polyester film for a magnetic recording medium, which comprises a polyester film, a discontinuous film layer or layers adhering closely to one surface or both the surfaces of said polyester film, said discontinuous film layer or layers having a height smaller than 500 angstroms and being composed mainly of a water-soluble polymer, and fine particles present in said discontinuous film layer or layers and on the or each surface of said discontinuous film layer or layers, or on the exposed surface or surfaces of said polyester film in the portions where said discontinuous film layer or layers are not present.

DESCRIPTION OF THE PREFERRED EMBODIMENTS

Figure 1:
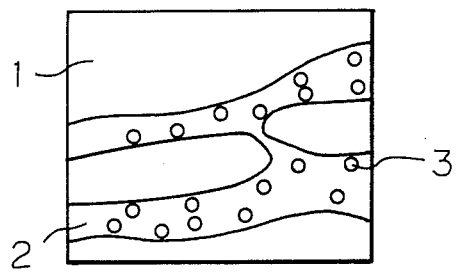
FIGS. 1, 2 and 3 are plane views diagrammatically illustrating a polyester film having a discontinuous film layer formed thereon according to the present invention.

The polyester film used in the present invention is a polyester film formed by a customary method, namely, a film formed by melting a polyester, extruding the melt in the form of a sheet or cylinder and drawing the extrudate in at least one direction. From the viewpoint of the mechanical characteristics, an ordinary balanced film, a monoaxially stretched film and a biaxially stretched film are preferred. It is preferred that the surfaces of the polyester film be smooth. More specifically, it is preferred that the surface roughness of the polyester film be such that the Ra value as determined by a tracer type surface roughness tester at a cut-off value of 0.08 mm is smaller than 0.015 $\mu$m, especially from 0.010 to 0.002 $\mu$m.

Incidentally, the Ra value referred to herein is determined as follows according to DIN 4768:

Undulations are removed from the curve of the section obtained by the tracer type surface roughness tester by using an appropriate cut-off value. The central line of the obtained roughness curve is determined so that the area of the portion above the central line is equal to the area of the portion below the central line. The arithmetic mean of absolute values of heights (or depths) of the curve from this central line is designated as the Ra value.

Any of substantially linear polyesters may be used as the film-forming polyester in the present invention. As typical instances, there can be mentioned polyethylene terephthalate, polyetramethylene terephthalate, poly-1,4-cyclohexylene-di-methylene terephthalate, polyethylene 2,6-naphthalene-dicarboxylate and polyethylene p-hydroxy-benzoate.

The polyester may be a homopolyester or a copolyester. As the comonomer used for the preparation of the copolyester, there can be mentioned diol components such as diethylene glycol, propylene glycol, neopentyl glycol, polyethylene glycol, p-xylylene glycol and 1,4-cyclohexanedimethanol, dicarboxylic acid components such as adipic acid, sebacic acid, phthalic acid, isophthalic acid, 2,6-naphthalene-dicarboxylic acid and 5-sodium sulfoisophthalate, polyfunctional carboxylic acid components such as trimellitic acid and pyromellitic acid, and p-hydroxyethoxybenzoic acid. It is preferable that the content of the comonomer component in the copolyester is up to 20 mole %.

The polyester may contain, mixed therewith, up to about 5% by weight of at least one member selected from alkali metal salt derivatives of sulfonic acid which are unreactive with the polyester and polyalkylene glycols which are substantially insoluble in the polyester. Furthermore, the polyester may contain generated particles composed of the polymerization residue or inactive particles externally added, which cause formation of projections on the film surface when the film is drawn. The content of such particles is such that when the polyester film is biaxially drawn, the haze per sheet is less than 5% at a thickness smaller than 30 $\mu$m.

By the term "generated particles" is meant particles which are precipitated in the polyester by the fact that at least a part of the catalyst residue or anti-coloring agent, containing Ca, Si, Mn, Mg, Sb, Ge, P, Li, K, or Na, is reacted with a monomer or oligomer in the polycondensation stage thereby to form insoluble particles. Such generated particles are described in U.S. Pat. No. 4,138,386 and No. 4,067,855.

The thickness of the discontinuous film layer or layers formed on one surface or both the surfaces of the polyester film is not larger than 500 angstroms and preferably 50 to 300 angstroms. If the thickness of the discontinuous film layer or layers is larger than 500 angstroms, the electromagnetic performances, especially the S/N ratio, of the vacuum-deposited film are degraded.

It is preferred that the particle size of the fine particles present in the discontinuous film layer and on the surface of the discontinuous film layer be 50 to 400 angstroms. By the "particle size" referred to herein is meant the maximum particle size of particles observed when the surface of the film of the present invention is examined by an electron microscope. The shape of the fine particles is not particularly critical. For example, the fine particles may have a spherical, ellipsoidal, rectangular parallelpiped or cubic shape. Fine particles having a flat shape are preferred. From the viewpoint of the running properties and electromagnetic performances of the surface of a vacuum-deposited film obtained by vacuum-depositing a magnetic material on one surface of the polyester film having a discontinuous film layer or layers, it is preferred that the particle size of the fine particles be in the range of from 50 to 400 angstroms.

Incidentally, the particle size of fine particles present on the surface or surfaces of the polyester film in the portions where the discontinuous film layer or layers are not present is 50 to 10,000 angstroms, preferably 100 to 5,000 angstroms.

In the case where the particle size of the fine particles present in the discontinuous film layer or layers and on the or each surface of the discontinuous film layer or layers is in the range of from 50 to 100 angstroms, from the viewpoint of the running property of a vacuum-deposited film obtained by vacuum-depositing a magnetic material on one surface of the polyester film having the discontinuous film layer or layers, it is preferred that the ratio of the area where the fine particles are present to the total area of the discontinuous film layer or layers be at least 10%.

In the case where the particle size of the fine particles is larger than 100 angstroms but not larger than 400 angstroms, if the number of the fine particles is from $10^4$ to $10^8$/mm$^2$, the electromagnetic performances, especially the S/N ratio, of the magnetic surface are good, and falling of the fine particles seldom happens.

The height of the fine particles present in the discontinuous film layer or layers and on the or each surface of the discontinuous film layer or layers is smaller than 1,000 angsgroms and preferably smaller than 500 angstroms. By the "height" is meant the maximum height of the fine particles present on the surface of the discontinuous film layer from the discontinuous film layer-formed surface (the surface of the polyester film). If the height of the fine particles exceeds 1,000 angstroms, the drop-out, one of the electromagnetic performances, is drastically increased.

From the viewpoint of the running property and electromagnetic performances of the vacuum-deposited surface, it is preferred that the number of the fine particles present on the surface or surfaces of polyester film in the portions where the discontinuous film layer or layers are not present be from $10^4$ to $10^8/mm^2$ and that the height of at least 20%, preferably at least 50%, of the above fine particles be in the range of from 20 to 500 angstroms, preferably from 30 to 200 angstroms, from the or each surface of the discontinuous film layer or layers. If the height is within the above range, the S/N ratio is not reduced and the drop-out is small. If the number of the fine particles is in the range of from $10^4$ to $10^8/mm^2$, preferably from $10^5$ to $10^7/mm^2$, the running property of the vacuum-deposited film surface is improved, and the electromagnetic performances, especially the S/N ratio, are good.

The thickness of the discontinuous film layer is smaller than 500 angstroms and preferably 50 to 300 angstroms. If the thickness of the discontinuous film layer exceeds 500 angstroms, the electromagnetic performances, especially the S/N ratio, of the vacuum-deposited film are degraded.

The water-soluble polymer forming the discontinuous film preferably has a molecular weight of 10,000 to 2,000,000, more preferably 100,000 to 1,000,000. If the molecular weight is lower than 10,000, the film layer becomes too soft, and retention of the structure is difficult and the durability is poor. If the molecular weight is higher than 2,000,000, the film layer is too rigid and brittle, and the durability is poor. Polyvinyl alcohol, tragacanth gum, gum arabic, casein, gelatin, methyl cellulose, hydroxyethyl cellulose and carboxymethyl cellulose are used as the water-soluble polymer.

In order to improve the slip characteristic and scratch resistance of the discontinuous film layer, it is preferred that a silicone resin or fluorine compound be incorporated in the discontinuous film layer.

A silicone resin having a molecular weight of 30,000 to 300,000 is preferred as the silicone resin. A silicone resin having a backbone chain represented by the following formula:

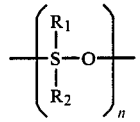

wherein $R_1$ stands for $CH_3$, $C_6H_5$ or H, $R_2$ stands for $CH_3$, $C_6H_5$, H or a functional group such as an epoxy group, an amino group or a hydroxyl group, and n is a number of 100 to 7,000, and containing epoxy, amino, hydroxyl or other functional groups at the molecule ends is especially preferred. The silicone resin is not necessarily a homopolymer, but a copolymer or a blend of several homopolymers may be used.

If the molecular weight of the silicone resin is preferably from 30,000 to 300,000, a good balance is attained between the hardness and brittleness of the discontinuous film layer.

A fluorine-containing surface active agent and a fluorine-containing hydrocarbon compound are used as the flourine compound, and a fluorine compound in which the ratio of the number of fluorine atoms to the number of all the atoms is 10 to 60%, especially 20 to 50%, is preferred.

In order to increase the bonding among the water-soluble polymer, the silicone resin and/or the fluorine compound and the fine particles and increase the bonding force between the discontinuous film layer and the polyester film layer, it is preferred that a silane coupling agent be incorporated in the discontinuous film layer.

As the silane coupling agent, there can be mentioned an organic silicon-containing monomer having at least two different reactive groups in the molecule. As one reactive group, there can be mentioned a methoxy group, an ethoxy group and a silanol group, and as the other reactive group, there can be mentioned a vinyl group, an epoxy group, a methacrylic group, an amino group and a mercapto group. Reactive groups capable of being bonded to the side chain and terminal groups of the water-soluble polymer, and to the polyester are preferred. As typical instances of the silane coupling agent, there can be mentioned vinyltrichlorosilane, vinyltriethoxysilane, viny-tris($\beta$-methoxyethoxy)silane, $\gamma$-glycidoxypropyltrimethoxysilane, $\gamma$-methacryloxypropyltrimethoxysilane, N-$\beta$-(aminoethyl)-$\gamma$-aminopropyltrimethoxysilane, N-$\beta$-(aminoethyl)-$\gamma$-aminopropylmethyltrimethoxysilane, $\gamma$-chloropropyltrimethoxysilane, $\gamma$-mercaptopropyltrimethoxysilane and $\gamma$-aminopropyltriethoxysilane.

As the fine particles, there can be used inactive inorganic fine particles and fine particles of a particle-forming organic polymer, though the kind of the fine particles is not particularly critical. As the inorganic fine particles, there can be mentioned particles of MgO, ZnO, $MgCO_3$, $CaCO_3$, $CaSO_4$, $BaSO_4$, $Al_2O_3$, $SiO_2$ and $TiO_2$. Furthermore, particles of particle-forming organic acid salts, especially Ca, Ba, Zn and Mn salts of organic acids may be used. As the fine particles of the particle-forming organic polymers, there can be mentioned particles of polystyrene, polyethylene, a polyamide, a polyester, a polyacrylic acid ester, a polyepoxy resin, polyvinyl acetate, polyvinyl chloride, sodium polyacrylate, polyvinyl methyl ether and a fluorine-containing resin.

In the case where the particle size of the fine particles present in the discontinuous film layer or layers and on the or each surface of the discontinuous film layer or layers is in the range of from 50 to 100 angstroms, it is preferred that the ratio of the area of the discontinuous film layer or layers where the fine particles are present to the area of the whole discontinuous film layer or layers be at least 10%. In this case, it is preferred that the weight ratio of [A] water-soluble polymer, [B] silicone resin and/or fluorine compound, [C] silane coupling agent and [D] fine particles in the discontinuous film layer, that is, the weight ratio [A]/[B]/[C]/[D], is 20/(0-10)/(0-10)/(2-40), preferably 20/(0-10)/(1-10)/(2-40).

In the case where the particle size of the fine particles present in the discontinuous film layer and on the surface of the discontinuous film layer is larger than 100 angstroms but not larger than 400 angstroms, it is preferred that the number of the fine particles be in the range of from $10^4$ to $10^8/mm^2$. In this case, it is preferred that the above-mentioned weight ratio [A]/[B]/[C]/[D] in the discontinuous film layer be 20/(0-10)/(0-10)/(0.1-20), preferably 20/(0-10)/(1-10)/(0.1-20).

In the case where the fine particles are present on the surface of the polyester film in the portion where the discontinuous film layer is not present, it is preferred that the above-mentioned weight ratio [A]/[B]/[C]/[D] in the discontinuous film layer be 20/(0-20)/(0-20)/(1-10), preferably 20/(0-20)/(1-20)/(1-10).

In each case, use of the components [B] and [C] is preferred for improving the slip characteristic and scratch resistance and increasing the bonding force among the components, but they are not indispensable components. If the amount of the component [B] is too large, the adhesion strength of the vacuum-deposited film is often degraded. If the amount of the component [C] is too large, the discontinuous film layer is liable to be too hard and brittle. Accordingly, it is preferred that the components [B] and [C] be used in amounts included with the above-mentioned ranges.

In the case where the fine particles are present on the surface or surfaces of the polyester film in the portions where the discontinuous film layer or layers are not present, particles of an organic polymer are preferred as the fine particles. In this case, use of fine particles of an organic polymer having a poor compatibility with the water-soluble polymer is preferred. The fine particles of the organic polymer may be used in the form of particles or an organic polymer emulsion. Ordinarily, an organic polymer emulsion is preferred because it is easily handled.

Figure 2:
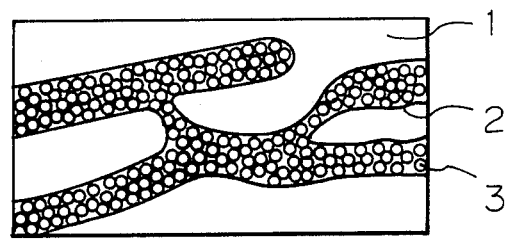
Figure 3:
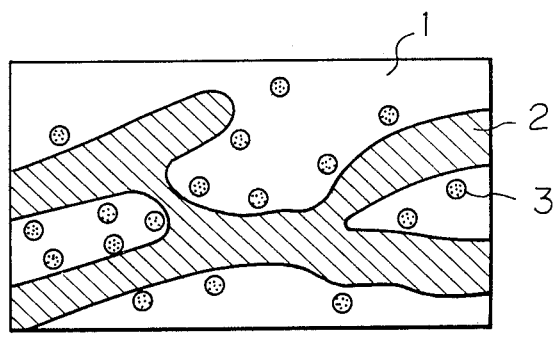
Figure 4:
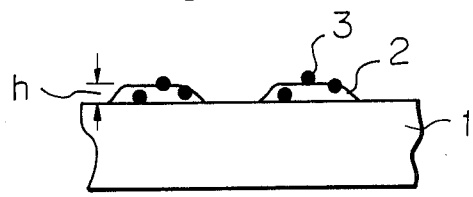
FIGS. 4, 5, and 6 are section views diagrammatically illustrating the polyester films disclosed in FIGS. 1, 2, and 3, respectively.
Figure 5:
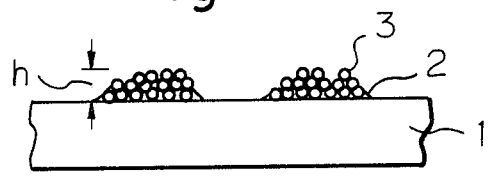
Figure 6:
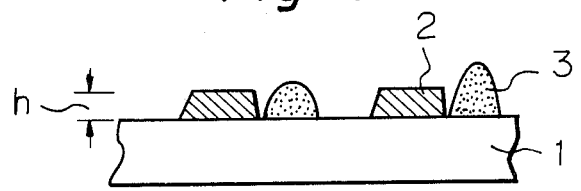

The state of the discontinuous film layer or layers and the fine particles present in the discontinuous layer or layers and on the or each surface of the discontinuous layer or layers or on the exposed surface or surfaces of the polyester film in the portions where the discontinuous film layer or layers are not present is diagrammatically illustrated in FIGS. 1 through 6. FIGS. 1 and 2 are plane views showing a polyester film 1 comprising a discontinuous film layer 2 partially covering the surface of the polyester film 1 and particles 3 present in the discontinuous film layer 2 and on the surface of the discontinuous film layer 2. This state can be observed by an electron microscope at more than 10,000 magnifications. FIGS. 4 and 5 are sectional views corresponding to FIGS. 1 and 2, and it is seen that the fine particles 3 are present in the interior of the discontinuous film layer 2 and on the surface thereof. FIG. 3 is a plane view diagrammatically showing a polyester film 1 of the present invention comprising a discontinuous film layer 2 and fine particles 3 present on the surface of the polyester film 1 in the portions where the discontinuous film layer 2 is not present. FIG. 6 is a sectional view corresponding to FIG. 3. It is seen that fine particles 3 are present on the surface of the polyester film 1 in the portions where the discontinuous film layer 2 is not present. This state can be observed by an electron microscope at more than 10,000 magnifications.

Figure 7:
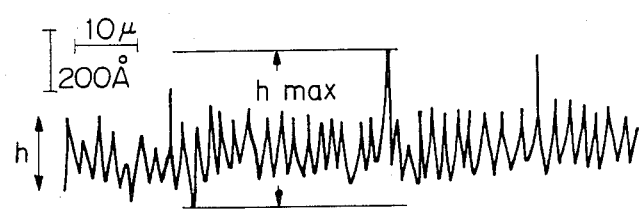
FIG. 7 is a surface roughness curve chart of a discontinuous film layer formed according to the present invention, as measured by a tracer type surface roughness tester at 500,000 magnifications in the thickness direction, in which h stands for the thickness of the discontinuous film layer and hmax represents the height of fine particles.

The thickness of the discontinuous film layer of the present invention is indicated by h in FIG. 7. The thickness of the discontinuous film layer is measured by determining a surface roughness curve of the discontinuous film layer-formed surface by a tracer type surface roughness tester at a cut-off value of 0.08 mm at 500,000 magnifications in the thickness direction, and measuring the mean distance between the peak and the valley in the so-determined surface roughness curve except portions of peaks due to the fine particles. The height of the fine particles is the height of the peak seen from the bottom of the valley in the surface roughness curve, which is indicated by hmax.

Tape characteristics are evaluated by repeating recording and reproduction in VTR of the VHS system.

For evaluation of the running property, reproduction is carried out under normal temperature and normal humidity conditions and under high temperature and high humidity conditions, and the running property is evaluated based on fluctuation of the image due to disturbance in running according to the following rating:

A: good running and no fluctuation of reproduced image

B: fluctuation of reproduced image by frequent reduction of running speed

For evaluation of the scratch resistance, running is repeated 100 times under normal temperature and normal humidity conditions and under high temperature and high humidity conditions, respectively. After this running test, scratches formed on the film are observed, and the scratch resistance is evaluated according to the following rating:

A: no substantial formation of scratches on magnetic film surface of tape

B: formation of very small scratches on magnetic film surface of tape

C: formation of large scratches on magnetic film surface of tape

By the normal temperature and normal humidity conditions are meant conditions of a temperature of 25° C. and a relative humidity of 60%, and by the high temperature and high humidity conditions are meant conditions of a temperature of 40° C. and a relative humidity of 80%.

For evaluation of the S/N ratio, a 50% white level signal is recorded at an optimum recording current of each tape, the ratio of the signal to the noise in a video modulation signal at the time of reproduction is determined by using a video noise meter and the obtained result (dB) is compared with the result of a commercially available VHS standard tape.

For the evaluation of the drop-out, a three-stepped wave signal is recorded on a magnetic recording tape at an optimum recording current, the number of drop-outs in which the attenuation of the output of a video head amplifier at the reproduction is higher than 18 dB and the duration time is longer than 20 $\mu$sec is counted for 10 minutes by a drop-out counter, and a mean value per minute is calculated.

The S/N ratio and drop-out measurements are carried out under normal temperature and normal humidity conditions.

A ferromagnetic material thin layer is formed on one surface (on which the discontinuous film layer has been formed) of the film having the fine particle-formed discontinuous film layer or layers on one or both the surfaces thereof. The surface of the fine particle-formed discontinuous film layer is electron-microscopically very irregular, so the area falling in contact with a magnetic head, a guide and the like is reduced. Accordingly, the running property of the surface of the thin layer of the ferromagnetic material is highly improved.

The process for the production of the product of the present invention will now be described. An aqueous solution of a water-soluble polymer having a molecular weight of 10,000 to 2,000,000, which contains inorganic fine particles and/or organic fine particles, preferably in combination with a silicone resins and/or a fluorine compound and a silane coupling agent, is coated and dried on at least one surface of a smooth polyester uniaxially drawn according to a customary method, and the coated film is then drawn in a direction rectangular to the direction of the above-mentioned uniaxial drawing and optionally, after this drawing, the film is further drawn in the same direction as the direction of the above-mentioned uniaxial drawing. Then, the drawn film is subjected to a heat treatment. More specifically, a starting polyester as described hereinbefore is melt-extruded by a customary film-forming machine, and the extrudate is cooled and drawn in the longitudinal direction at a draw ratio of 3 to 5. At least one surface of the longitudinally drawn film is coated with an aqueous solution of a water-soluble polymer containing fine particles, preferably in combination with a silicone resin and/or a fluorine compound and a silane coupling agent, according to a known coating method before the preheating and transverse drawing steps. The amount of the aqueous solution coated on one surface is 3 to 1,000 mg/m$^2$ as the solid concentration. Then, the coated and longitudinally drawn film is transversely drawn. In order to complete formation of a film layer before the transverse drawing, it is necessary to completely evaporate water contained in the coating solution on the surface of the film. This is accomplished by effecting preheating at a hot air temperature of 100° to 150° C. in a stenter preheating zone of the biaxial drawing machine so that the water drying rate is in the range of from 5 to 100%/sec. Then, the film is transversely drawn at a drawing temperature of 90° to 120° C. and a draw ratio of 2.5 to 4.5. By the transverse drawing conducted after completion of drying and formation of the film layer, a discontinuous film layer containing the fine particles is formed on one surface of the film closely adhering thereto. Incidentally, when fine particles of an organic polymer having a poor compatibility with the water-soluble polymer are used as the fine particles, a film having a structure as shown in FIG. 3 is obtained. The transversely drawn film is heat-treated at 180° to 220° C., or if necessary, the transversely drawn film is drawn again in the longitudinal direction at a draw ratio of 1.1 to 1.8 and is then heat-treated at 180° to 220° C., whereby a biaxially drawn polyester film having on at least one surface thereof fine particles and a discontinuous film layer having a thickness smaller than 500 angstroms is obtained.

As described hereinbefore, by forming a discontinuous film layer composed mainly of a water-soluble polymer on one surface or both the surfaces of a polyester film and making fine particles present on the surface or surfaces of the film, the running property of the surface of a vacuum-deposited film formed on the discontinuous film layer is prominently improved, and also the running property under high temperature and high humidity conditions and the durability are highly improved. Furthermore, since the thickness of this discontinuous film layer is smaller than 500 angstroms, the electromagnetic performances of the vacuum-deposited tape are not degraded. Moreover, since the maximum height of the fine particles in smaller than 1000 angstroms, increase of the drop-out is not caused. Accordingly, the polyester film of the present invention is very valuable as a base film for a high quality video tape of the metal vacuum deposition type capable of high density recording or for a floppy disc unit.

The production of the base film of the present invention and the production of a vacuum-deposited video tape by using the base film of the present invention will now be described in detail with reference to the following examples.

EXAMPLE 1

Polyethylene terephthalate which was substantially free of particles and was substantially non-oriented and non-crystalline was melt-extruded onto a rotary drum maintained at about 20° C., and the extrudate was drawn at a draw ratio of 3.4 in the machine direction and both the surfaces of the film were coated at a solid concentration of 20 mg/m$^2$ with an aqueous solution containing 0.19% by weight of methyl cellulose and 0.35% by weight of ultra-finely divided silica particles having an average particle size of 60 angstroms by using a metering bar coater. The drying, preheating and drawing were carried out at a temperature of 115° C. and the water evaporation rate was 15%/sec.

The film was transversely drawn at a draw ratio of 3.4 and heat-treated at 200° C. Thus, a polyethylene terephthalate base film having a thickness of 12 μm, on both the front and back surfaces of which a discontinuous film layer having a thickness of 260 angstroms and having the substantially entire surface covered with the fine particles was formed, was obtained.

A cobalt-nickel alloy film having a thickness of 1,500 angstroms was formed on the surface of the polyester film by vacuum deposition. The film was cut into a predetermined width in the machine direction to form a magnetic tape. The properties of the magnetic tape are shown in Table 1.

EXAMPLE 2

A polyethylene terephthalate base film having a thickness of 12 μm, on both the front and back surfaces of which a discontinuous film layer having a thickness of 300 angstroms and having the substantially entire surface covered with fine particles was formed, was prepared in the same manner as described in Example 1 except that 0.40% by weight of an epoxidized polydimethylsiloxane emulsion (having a solid concentration of 20% by weight) as the silicone resin and 0.05% by weight of N-β-(aminoethyl)-γ-aminopropylmethyldimethoxysilane as the silane coupling agent were further added to the aqueous coating solution used in Example 1.

A vacuum-deposited magnetic tape was prepared by using this base film in the same manner as described in Example 1. The properties of the tape are shown in Table 1.

EXAMPLE 3

A polyethylene terephthalate base film having a thickness of 12 μm, on both the front and back surfaces of which a discontinuous film layer having a thickness of 270 angstroms and having the substantally entire surface with fine particles was formed, was prepared in the same manner as described in Example 1 except that 0.37% by weight of ultra-fine particles of titanium oxide having an average particle size of 70 angstroms were used instead of the fine particles of silica used in Example 1.

A vacuum-deposited magnetic tape was prepared by using this base film in the same manner as described in Example 1. The properties of the tape are shown in Table 1.

COMPARATIVE EXAMPLE 1

A polyethlene terephthalate base film having a thickness of 12 μm, on both the front and back surfaces of which a discontinuous film layer having a thickness of 600 angstroms and having the substantially entire surface covered with fine particles was formed, was prepared in the same manner as described in Example 1 except that the concentration of methyl cellulose in the aqueous coating solution was changed to 0.39% by weight.

A vacuum-deposited magnetic tape was prepared by using this base film in the same manner as described in Example 1. The properties of the tape are shown in Table 1.

predetermined width in the machine direction to form a magnetic tape. The properties of the magnetic tape are shown in Table 2.

EXAMPLE 5

A polyethylene terephthalate base film, having a thickness of 12 $\mu$m, on both the surfaces of which a discontinuous film layer having a thickness of 300 angstroms and containing fine particles having a height of 500 angstroms and being present at a number of

TABLE 1

|  | Surface Structure of Base Film | | | Properties of Tape | | | | |
|---|---|---|---|---|---|---|---|---|
|  | Thickness (Å) of Discontinuous Film Layer | Fine Particles | | Running Property | Scratch Resistance | | Electromagnetic Performance | |
|  |  | Size (Å) | Area Ratio (%) | Normal Temperature and Normal Humidity | High Temperature and High Humidity | Normal Temperature and Normal Humidity | High Temperature and High Humidity | S/N Ratio (dB) |
| Example 1 | 260 | 60 | 60 | A | A | A | A–B | +25 |
| Example 2 | 300 | 60 | 62 | A | A | A | A–B | +20 |
| Example 3 | 270 | 70 | 63 | A | A | A | B | +22 |
| Comparative Example 1 | 600 | 60 | 65 | A | A | A | A | −10 |

As is apparent from the results shown in Table 1, a magnetic recording medium prepared from a polyester film having a discontinuous film layer or layers having a thickness of not larger than 500 angstroms and adhering closely to the polyester film, which is composed mainly of a water-soluble high polymer and fine particles having a particle size of 50 to 100 angstroms and in which the fine particles are present on the surface of the discontinuous film layer at an area ratio of at least 10%, and forming a ferromagnetic material thin film on the discontinuous film layer or layers in which the fine particles are present, is excellent in the running property and scratch resistance under not only normal temperature and normal humidity conditions but also high temperature and high humidity conditions. Furthermore, this magnetic recording medium has a good smoothness and is excellent in the electromagnetic performances.

EXAMPLE 4

A starting polyester which was substantially free of particles and was substantially non-oriented and non-crystalline was melt-extruded onto a rotary drum maintained at about 20° C., and the extrudate was drawn at a draw ratio of 3.4 in the machine direction and both the surfaces of the film were coated at a solid concentration of 20 mg/m² by using a metering bar coater with an aqueous solution containing 0.20% by weight of methyl cellulose and 0.15% by weight of finely divided silica having an average particle size of 200 angstroms.

The drying, preheating and drawing were carried out at a temperature of 115° C., and the water evaporation rate was 15%/sec.

The coated film was transversely drawn at a draw ratio of 3.4 and heat-treated at a temperature of 200° C. Thus, a polyethylene terephthalate base film having a thickness of 12 $\mu$m, on both the front and back surfaces of which a discontinuous film having a thickness of 260 angstroms and containing the fine particles having a height of 450 angstroms and being present at a number of $5 \times 10^6/mm^2$, was formed, was obtained.

A cobalt-nickel alloy film having a thickness of 1,500 angstroms was formed on the surface of the polyester film by vacuum deposition. The film was cut into a predetermined width in the machine direction to form a magnetic tape.

$5 \times 10^6/mm^2$ was formed, was prepared in the same manner as described in Example 4 except that 0.40% by weight of an epoxidized polydiethylsiloxane emulsion (having a solid concentration of 20% by weight) as the silicone resin and 0.05% by weight of N-$\beta$-(aminoethyl)-$\gamma$-aminopropylmethyldimethoxysilane as the silane coupling agent were further added to the aqueous solution used in Example 4.

A vacuum-deposited magnetic tape was prepared by using this base film in the same manner as described in Example 4. The properties of the tape are shown in Table 2.

EXAMPLE 6

A polyethylene terephthalate base film having a thickness of 12 $\mu$m, on both the surfaces of which a discontinuous film layer having a thickness of 260 angstroms and containing fine particles having a height of 480 angstroms and being present at a number of $5 \times 10^6/mm^2$ was formed, was prepared in the same manner as described in Example 4 except that finely divided calcium carbonate having an average particle size of 210 angstroms was used instead of the finely fivided silica used in Example 4.

A vacuum-deposited magnetic film was prepared by using this base film in the same manner as described in Example 4. The properties of the tape are shown in Table 2.

COMPARATIVE EXAMPLE 2

A polyethylene terephthalate base film having a thickness of 12 $\mu$m, on both the surfaces of which a discontinuous film layer having a thickness of 600 angstroms and containing fine particles having a height of 810 angstroms and being present at a number of $5 \times 10^6/mm^2$ was formed, was prepared in the same manner as described in Example 4 except that the concentration of methyl cellulose in the aqueous coating solution was changed to 0.40% by weight.

A vacuum-deposited magnetic tape was prepared by using this base film in the same manner as described in Example 4. The properties of the tape are shown in Table 2.

TABLE 2

| | Surface Structure of Base Film | | | | Properties of Tape | | | | | |
|---|---|---|---|---|---|---|---|---|---|---|
| | Thickness (Å) of Discontinuous Film Layer | Fine Particles | | | Running Property | | Scratch Resistance | | Electromagnetic Performance | |
| | | Average Size (Å) | Average Height (Å) | Number (per mm²) | Normal Temperature and Normal Humidity | High Temperature and High Humidity | Normal Temperature and Normal Humidity | High Temperature and High Humidity | S/N Ratio (dB) | Number of Drop-outs per Minute |
| Example 4 | 260 | 200 | 450 | 5 × 10⁶ | A | A | A | A-B | +15 | 25 |
| Example 5 | 300 | 200 | 500 | 5 × 10⁶ | A | A | A | A-B | +13 | 29 |
| Example 6 | 260 | 210 | 480 | 5 × 10⁶ | A | A | A-B | B | +14 | 27 |
| Comparative Example 2 | 660 | 200 | 810 | 5 × 10⁶ | A | A | A | A | −10 | 100 |

From the results shown in Table 2, it will readily be understood that a magnetic recording medium prepared from a polyester base film comprising a discontinuous film layer or layers having a thickness not larger than 500 angstroms, adhering closely to the polyester film and being composed mainly of a water-soluble polymer and fine particles which are present in the discontinuous film layer or layers and on the or each surface of the discontinuous film layer or layers at a number of $10^4$ to $10^8$/mm² and have a particle size of larger than 100 angstroms but not larger than 400 angstroms and a height of not larger than 1000 angstroms, and forming a thin ferromagnetic material film on the discontinuous film layer, has good running property and scratch resistance under not only normal temperature and normal humidity conditions but also high temperature and high humidity conditions and is smooth and excellent in the electromagnetic performances.

EXAMPLE 7

A starting polyethylene terephthalate which was substantially free of particles and was substantially non-oriented and non-crystalline was melt-extruded onto a rotary drum maintained at about 20° C., and the extrudate was drawn at a draw ratio of 3.4 in the machine direction and both the surfaces of the film were coated at a solid concentration of 20 mg/m² by using a metering bar coater with an aqueous emulsion comprising 0.20% by weight methyl cellulose and 0.10% by weight of a polyacrylic acid ester emulsion (having a solid concentration of 40%) as the starting material for formation of organic polymer particles. The drying temperature, preheating temperature and drawing temperature were 115° C., and the water evaporation rate was 15%/sec.

The coated film was transversely drawn at a draw ratio of 3.4 and heat-treated at 200° C. Thus, a polyester base film having a thickness of 12 μm, on both the surfaces of which a discontinuous film layer having a height of 260 angstroms was formed and fine particles having a height larger by 50 angstroms than that of the discontinuous film layer were adherently present at a number of 4×10⁶/mm² in the portions where the discontinuous film layer was not present, was formed.

A cobalt-nickel alloy thin film having a thickness of 1,500 angstroms was formed on the surface of this polyester film by vacuum deposition. The film was cut in a predetermined width in the machine direction to form a magnetic tape. The properties of the tape are shown in Table 3.

EXAMPLE 8

A polyethylene terephthalate base film having a thickness of 12 μm, on both the surfaces of which a discontinuous film layer having a height of 280 angstroms was formed and fine particles having a height larger by 30 angstroms than that of the discontinuous film layer were adherently present at a number of 4×10⁶/mm² in the portions where the discontinuous film layer was not present, was prepared in the same manner as described in Example 7 except that 0.40% by weight of an epoxidized polydimethylsiloxane emulsion (having a solid concentration of 20% by weight) as the silicon resin for improving the slip characteristic and 0.05% by weight of N-β-(aminoethyl)-γ-aminopropyl-methyldimethoxysilane as the silane coupling agent were further added to the aqueous emulsion used in Example 7.

A magnetic tape was prepared by using this base film in the same manner as described in Example 7. The properties of the tape are shown in Table 3.

EXAMPLE 9

A polyethylene terephthalate base film having a thickness of 12 μm, on both the surfaces of which a discontinuous film having a thickness of 270 angstroms was formed and fine particles having a height larger by 40 angstroms than that of the discontinuous film layer were adherently formed at a number of 4×10⁶/mm² in the portions where the discontinuous film layer was not present, was prepared in the same manner as described in Example 8 except that 0.30% by weight of a perfluoroalkyl fluorinated emulsion (having a solid concentration of 10% by weight) was used as the component for improving the slip characteristic instead of the epoxidized polydimethylsiloxane emulsion used in Example 8.

A magnetic tape was prepared in the same manner as described in Example 7 by using this base film. The properties of the tape are shown in Table 3.

EXAMPLE 10

A polyethylene terephthalate base film having a thickness of 12 μm, on both the surfaces of which a discontinuous film having a thickness of 270 angstroms was formed and fine particles having a height larger by 50 angstroms than that of the discontinuous film layer were adherently formed at a number of 3×10⁶/mm² in the portions where the discontinuous film layer was not present, was prepared in the same manner as described in Example 8 except that 0.10% by weight of a polyvinyl acetate emulsion (having a solid concentration of 35% by weight) was used instead of the polyacrylic acid ester emulsion used in Example 8.

A magnetic tape was prepared in the same manner as described in Example 7 by using this base film. The properties of the tape are shown in Table 3.

COMPARATIVE EXAMPLE 3

A polyethylene terephthalate base film having a thickness of 12 μm, on both the surfaces of which a discontinuous film layer having a height of 600 angstroms was formed and fine particles having a height smaller than that of the discontinuous film layer were adherently present at a number of $4 \times 10^6/\text{mm}^2$ in the portions where the discontinuous film layer was not present, was prepared in the same manner as described in Example 7 except that the concentration of methyl cellulose was changed to 0.40% by weight.

A magnetic tape was prepared by using this base film in the same manner as described in Example 7. The properties of the tape are shown in Table 3.

COMPARATIVE EXAMPLE 4

A polyethylene terephthalate base film having a thickness of 12 μm, on both the surfaces of which a discontinuous film layer having a height of 260 angstroms was formed and fine particles were not formed, was prepared in the same manner as described in Example 7 except that the polyacrylic acid ester emulsion was not used at all.

A magnetic tape was prepared in the same manner as described in Example 7 by using this base tape. The properties of the tape are shown in Table 3.

From the results shown in Table 3, it will readily be understood that a magnetic tape prepared by using a polyester film of the present invention having a discontinuous film layer and fine particles closely adhering thereto and forming a vacuum-deposited film on the surface of the polyester film where the discontinuous film layer and fine particles are present has good running property and scratch resistance under not only normal temperature and normal humidity conditions but also high temperature and high humidity conditions, and is smooth and excellent in the electromagnetic performances.

TABLE 3

| | Surface Structure of Base Film | | | Properties of Tape | | | | | |
|---|---|---|---|---|---|---|---|---|---|
| | Thickness (Å) of Discontinuous Film Layer | Fine Particles | | Running Property | | Scratch Resistance | | Electromagnetic Performance | |
| | | Average Height (Å) | Number per mm² | Normal Temperature and Normal Humidity | High Temperature and High Humidity | Normal Temperature and Normal Humidity | High Temperature and High Humidity | S/N Ratio (dB) | Number of Drop-outs per Minute |
| Example 7 | 260 | 310 | $4 \times 10^6$ | A | A | A | A–B | +14 | 26 |
| Example 8 | 280 | 310 | $4 \times 10^6$ | A | A | A | A–B | +12 | 30 |
| Example 9 | 270 | 310 | $4 \times 10^6$ | A | A | A | A–B | +13 | 28 |
| Example 10 | 270 | 320 | $3 \times 10^6$ | A | A | A | A–B | +10 | 32 |
| Comparative Example 3 | 600 | — | $5 \times 10^6$ | A | B | B | C | −10 | 95 |
| Comparative Example 4 | 260 | 0 | 0 | A | B | B | C | +15 | 20 |

We claim:

1. A polyester film for a magnetic recording medium which comprises a polyester film, a discontinuous film layer or layers adhering closely to one surface or both the surfaces of said polyester film, said discontinuous film layer or layers having a thickness of not larger than 500 angstroms and being composed mainly of a water-soluble polymer, and fine particles present in said discontinuous film layer or layers and on the or each surface of said discontinuous film layer or layers, or on the exposed surface or surfaces of said polyester film in the portions where said discontinuous film layer or layers are not present.

2. A polyester film for a magnetic recording medium according to claim 1, wherein the particle size of the fine particles present in the discontinuous film layer or layers and on the or each surface of the discontinuous film layer or layers is in the range of from 50 to 400 angstroms.

3. A polyester film for a magnetic recording medium according to claim 1, wherein the particle size of the fine particles present on the exposed surface or surfaces of said polyester film in the portions where the discontinuous film layer or layers are not present is in the range of from 50 to 10,000 angstroms.

4. A polyester film for a magnetic recording medium according to claim 1, wherein the particle size of the fine particles present in the discontinuous film layer or layers and on the or each surface of the discontinuous film layer or layers is in the range of from 50 to 100 angstroms and the area ratio of the fine particles to the surface area of the discontinuous film layer or layers is at least 10%.

5. A polyester film for a magnetic recording medium according to claim 1, wherein the particle size of the fine particles present in the discontinuous film layer or layers and on the or each surface of the discontinuous film layer or layers is larger than 100 angstroms but not larger than 400 angstroms and the number of the fine particles is in the range of from $10^4$ to $10^8/\text{mm}^2$.

6. A polyester film for a magnetic recording medium according to claim 1, wherein the number of the fine particles present on the exposed surface or surfaces of said polyester film in the portions where the discontinuous film layer or layers are not present is in the range of from $10^4$ to $10^8/\text{mm}^2$.

7. A polyester film for a magnetic recording medium according to claim 1, wherein the height of the fine particles present in the discontinuous film layer or layers and on the surface of the discontinuous film layer or layers is not larger than 1,000 angstroms.

8. A polyester film for a magnetic recording medium according to claim 1, wherein the height of the fine particles present in the discontinuous film layer or layers and on the or each surface of the discontinuous film layer or layers is not larger than 500 angstroms.

9. A polyester film for a magnetic recording medium according to claim 1, wherein at least 20% of the fine particles present on the exposed surface or surfaces of said polyester film in the portions where the discontinuous film layer or layers are not present have a height larger by 20 to 500 angstroms than the height of the discontinuous film layer.

10. A polyester film for a magnetic recording medium according to claim 1, wherein the thickness of the discontinuous film layer or layers is in the range of from 50 to 300 angstroms.

11. A polyester film for a magnetic recording medium according to claim 1, wherein the ratio of the area of the discontinuous film layer or layers to the total surface area of said polyester film is in the range of from 10 to 90%.

12. A polyester film for a magnetic recording medium according to claim 1, wherein the ratio of the area of the discontinuous film layer or layers to the total surface area of said polyester film is in the range of from 30 to 80%.

13. A polyester film for a magnetic recording medium according to claim 1, wherein the or each discontinuous film layer comprises a water-soluble polymer and a silane coupling agent.

14. A polyester film for a magnetic recording medium according to claim 1, wherein the or each discontinuous film layer comprises a water-soluble polymer, a silane coupling agent and fine particles.

15. A polyester film for a magnetic recording medium according to claim 13, wherein the molecular weight of the water-soluble polymer is in the range of from 10,000 to 2,000,000.

16. A polyester film for a magnetic recording medium according to claim 13, wherein the water-soluble polymer is at least one polymer selected from the group consisting of polyvinyl alcohol, tragacanth gum, gum arabic, casein, gelatin, methyl cellulose, hydroxyethyl cellulose and carboxymethyl cellulose.

17. A polyester film for a magnetic recording medium according to claim 13, wherein the silane coupling agent is an organic silicon-containing monomer having at least two different reactive groups in the molecule.

18. A polyester film for a magnetic recording medium according to claim 13, wherein the silane coupling agent is a mono- or di-organoalkoxysilane.

19. A polyester film for a magnetic recording medium according to claim 17, wherein one of at least two different reactive groups of the silane coupling agent is a group selected from the group consisting of a methoxy group, an ethoxy group and a silanol group, and the other reactive group is a group selected from the group consisting of a vinyl group, an epoxy group, a methacrylic group, an amino group and a mercapto group.

20. A polyester film for a magnetic recording medium according to claim 13, wherein the silane coupling agent is an aminosilane compound.

21. A polyester film for a magnetic recording medium according to claim 1, wherein the fine particles are inactive inorganic fine particles.

22. A polyester film for a magnetic recording medium according to claim 1, wherein the fine particles are fine particles of a particle-forming organic polymer.

23. A polyester film for a magnetic recording medium according to claim 1, wherein the fine particles are fine particles of at least one member selected from the group consisting of MgO, ZnO, $MgCO_3$, $CaCO_3$, $CaSO_4$, $BaSO_4$, $Al_2O_3$, $SiO_2$ and $TiO_2$.

24. A polyester film for a magnetic recording medium according to claim 1, wherein the fine particles are fine particles of at least one member selected from polystyrene, polyethylene, a polyamide, a polyester, a polyacrylic acid ester, a polyepoxy resin, polyvinyl acetate, sodium polyacrylate, polyvinyl methyl ether and a fluorine-containing resin.

25. A polyester film for a magnetic recording medium according to claim 1, wherein the polyester is a homopolyester or copolyester comprising at least 80% by weight of a polycondensate of ethylene glycol with terephthalic acid or naphthalene-dicarboxylic acid.

26. A polyester film for a magnetic recording medium according to claim 1, wherein the polyester is polyethylene terephthalate.

27. A polyester film for a magnetic recording medium according to claim 1, wherein a ferromagnetic metal thin film is formed on one surface of the polyester film having the discontinuous film layer or layers.

28. A polyester film for a magnetic recording medium, which comprises a polyester film and a discontinuous film layer or layers adhereing closely to one surface or both the surfaces of said polyester film and being composed mainly of a water-soluble polymer and fine particles, wherein the thickness of said discontinuous film layer or layers is not larger than 500 angstroms, the particle size of said fine particles is in the range of from 50 to 400 angstroms, and said fine particles are present on at least 10% of the surface area of the discontinuous film layer or layers.

29. A polyester film for a magnetic recording medium, which comprises a polyester film and a discontinuous film layer or layers adhering closely to one surface or both the surfaces of said polyester film and being composed mainly of a water-soluble polymer or layers have fine particles, wherein the discontinuous film layer or layers have a thickness of 50 to 500 angstroms, the particle size of the fine particles is in the range of from 50 to 100 angstroms and the fine particles are present on at least 10% of the surface area of the discontinuous film layer or layers.

30. A polyester film for a magnetic recording medium, which comprises a polyester film, a discontinuous film layer or layers adhering closely to one surface or both the surfaces of the polyester film, having a thickness not larger than 500 angstroms and being composed mainly of a water-soluble polymer, and fine particles present in the discontinuous film layer or layers and on the or each surface of the discontinuous film layer or layers, wherein the particle size of the fine particles is at least 50 angstroms, the height of the fine particles is not larger than 1,000 angstroms and the fine particles are present at a number of $10^4$ to $10^8/mm^2$.

31. A polyester film for a magnetic recording medium, which comprises a polyester film, a discontinuous film layer or layers adhering closely to one surface or both the surfaces of the polyester film, having a thickness of 50 to 500 angstroms and being composed mainly of a water-soluble polymer, and fine particles present in the discontinuous film layer or layers and on the or each surface of the discontinuous film layer or layers, wherein the particle size of the fine particles is larger than 100 angstroms but not larger than 400 angstroms, the height of the fine particles is not larger, 1,000 angstroms and the fine particles are present at a number of $10^4$ to $10^8/mm^2$.

32. A polyester film for a magnetic recording medium, which comprises a polyester film, a discontinuous film layer or layers adhering closely to one surface or both the surfaces of the polyester film, having a height not larger than 500 angstroms and being composed mainly of a water-soluble polymer, and fine particles adhering closely to the exposed surface or surfaces of the polyester film in the portions where the discontinuous film layer or layers are not present, the height of said fine particles being larger by 20 to 500 angstroms than that of the discontinuous film layer or layers.

33. A polyester film for a magnetic recording medium, which comprises a polyester film, a discontinuous film layer or layers adhering closely to one surface or both the surfaces of the polyester film, having a height of 50 to 500 angstroms and being composed of a water-soluble polymer, and fine particles adhering closely to the exposed surface or surfaces of the polyester film in the portions where the discontinuous film layer or layers are not present, the particle size of the fine particles being in the range of from 50 to 10,000 angstroms.

* * * * *